Feb. 18, 1969 L. E. COTE 3,428,881

D.C. MOTOR SPEED CONTROL SYSTEM

Filed Sept. 2, 1966 Sheet 1 of 2

INVENTOR.
LOUIS E. COTE
BY
his ATTORNEYS

INVENTOR.
LOUIS E. COTE 3,428,881
D.C. MOTOR SPEED CONTROL SYSTEM
Louis E. Cote, Quaker Hill, Conn., assignor to General Dynamics Corporation, New York, N.Y., a corporation of Delaware
Filed Sept. 2, 1966, Ser. No. 576,962
U.S. Cl. 318—341     5 Claims
Int. Cl. H02p 5/16, 7/24, 7/58

ABSTRACT OF THE DISCLOSURE

A speed control system is provided for a D.C. motor operated from a battery comprising a silicon controlled rectifier between the battery and the motor. A reference frequency source periodically activates the silicon controlled rectifier, and an oscillator whose charge-up time is adjustable operates a silicon controlled rectifier which operates to block off the first rectifier. Means are provided in the reference frequency source to permit a short circuit across the secondary winding to shut off the first rectifier. Switch means are also provided for shutting off the first rectifier completely or enabling it to go full on for maximum operation of the motor.

---

This invention relates to speed control systems for direct current motors and, more particularly, to a new and improved D.C. motor speed control system providing efficient and reliable speed control over a wide and continuous range of power requirements.

Historically, control of this speed of direct current motors used in golf carts, fork lift trucks, and the like has been accomplished by varying a rheostat inserted in series with the motor, which provides continuous control but is wasteful of power, or by switching the field windings of the motor in series or in parallel, which does not permit continuous control. More recently, various power interruption speed control systems utilizing, for example, silicon control rectifiers have been developed but they have thus far been found to be either unreliable or overly complicated.

Accordingly, it is an object of the present invention to provide a new and improved D.C. motor speed control system which overcomes the above-mentioned disadvantages of present systems.

Another object of the invention is to provide a D.C. motor speed control system which is small and convenient, is economical of power, and is highly reliable.

A further object of the invention is to provide a D.C. motor speed control system which is easily adapted to a wide range of power requirements, from a few hundred watts to hundreds of kilowatts.

These and other objects of the invention are attained by providing a power switching arrangement responsive to a pulse duration control signal which regulates the proportion of each operating cycle in which power is transmitted to the motor, along with a frequency control regulating the operation of the switching arrangement to assure switching at the proper time. In a particular embodiment of the invention, the power switching arrangement comprises a silicon control rectifier (SCR) connected to transmit power to the motor whenever it is conductive, along with a commutator circuit including a capacitor and another SCR adapted to connect the capacitor across the first SCR to turn it off, both SCR's being synchronized with the frequency control. With this arrangement, the operation of the second SCR is governed by the frequency control so as to prevent the SCR transmitting power to the motor from being locked in the conductive condition.

Further objects and advantages of the invention will be apparent from a reading of the following description in conjunction with the accompanying drawings, in which.

Figure 1:
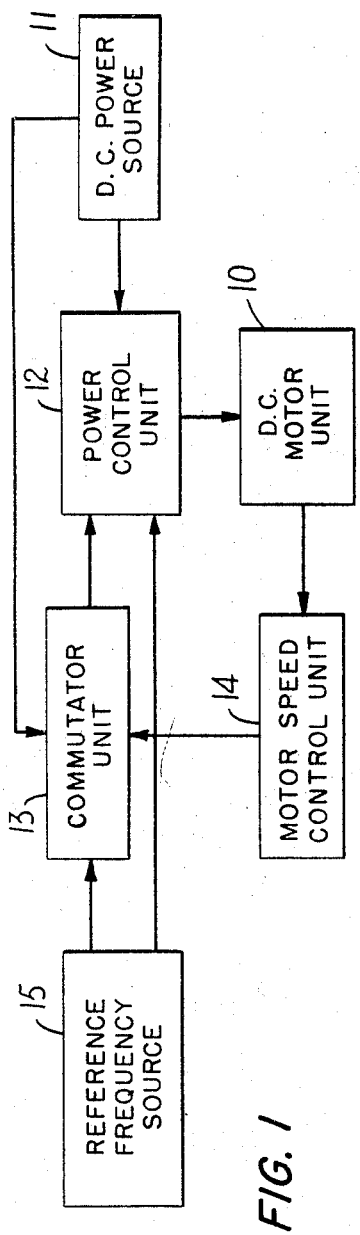
FIG. 1 is a schematic block diagram illustrating the arangement of a representative D.C. motor speed control system according to the invention.

In a typical D.C. motor speed control system illustrated in FIG. 1, a D.C. motor 10 is supplied with power from a D.C. power source 11 by a power control unit 12. The power control unit transmits power from the source to the motor in accordance with the operation of a commutator unit 13 which is, in turn, governed by signals from a motor speed control unit 14. A reference frequency source 15 supplies operating frequency pulses to the power control unit 12 and also to the commutator 13, the speed control unit 14 being adjustable to vary the duration of the operational portion of the frequency cycle.

Figure 2:
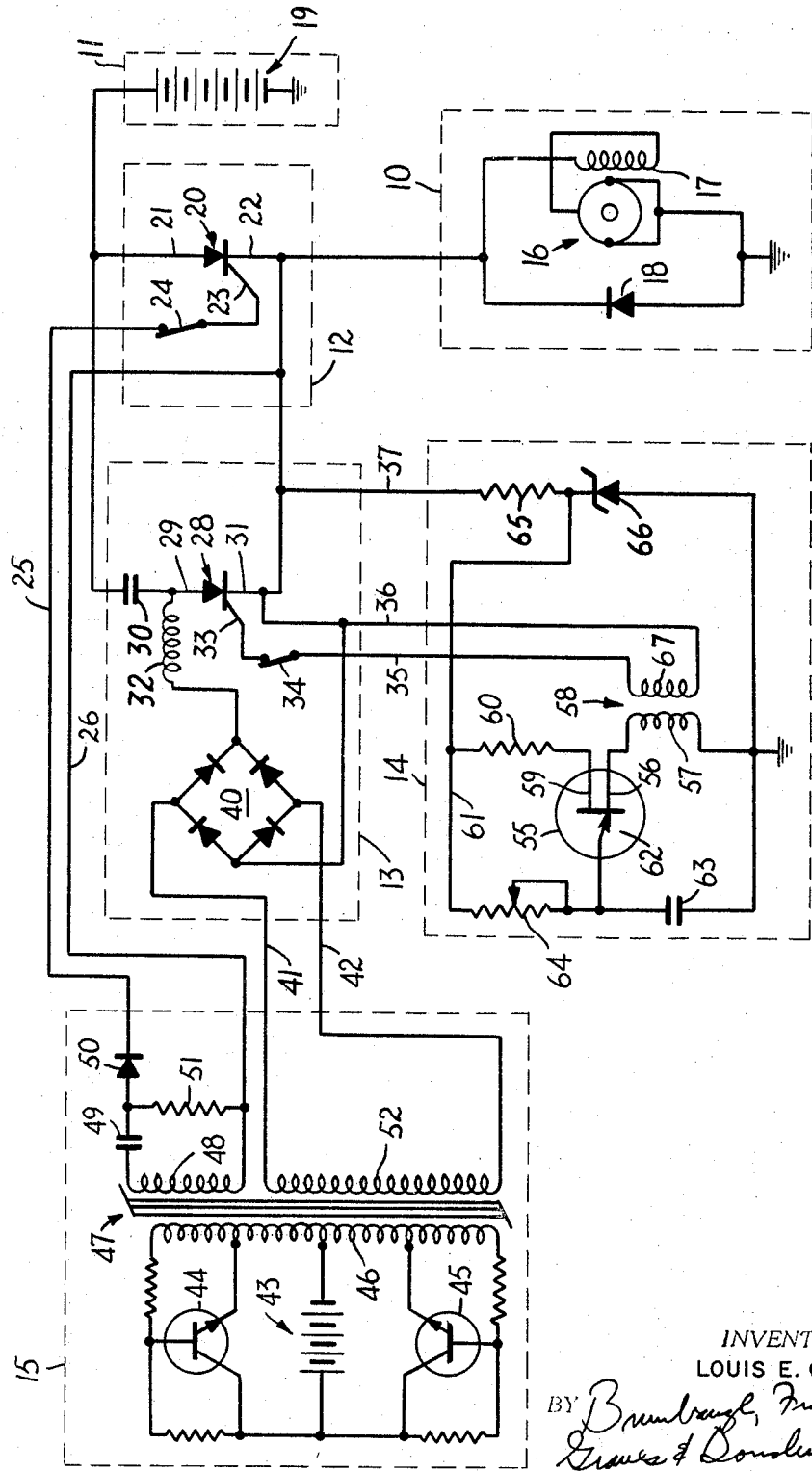
FIG. 2 is a schematic circuit diagram illustrating the circuit arrangement of the components in the block diagram of FIG. 1 for one embodiment according to the invention.

As illustrated in FIG. 2, the D.C. motor unit 10 includes a conventional D.C. motor 16 having a series field winding 17 and shunted by a diode 18 to protect the motor against excesive voltage due to the self-inductance. In the embodiment illustrated in FIG. 2, the power source 11 comprises a battery 19, both the battery and the motor unit being grounded. To complete the circuit between the source and the motor in a controlled manner, the power control unit 12 includes an SCR having its anode 21 connected to the positive terminal of the battery 11 and its cathode 22 connected to the motor unit 20. In addition, the control electrode 23 of the SCR 20 is connected through a switch 24 to a conductor 25 leading to the reference frequency source 15, the cathode 22 being connected to that source through another conductor 26.

Within the commutator unit 13, another SCR 28 has its anode 29 connected to one side of a commutation capacitor 30 the other side of which is connected to the positive terminal of the D.C. power source 11. The cathode 31 of this SCR is joined through a choke 32 to the cathode 22 of the SCR 20 and the control electrode 33 is joined through a switch 34 to a conductor 35 leading to the speed control unit 14, the cathode 31 being connected to that unit through another conductor 36. The cathode 22 of the SCR 20 is also connected to the control unit 14 through another conductor 37. Finally, the anode 29 and cathode 31 of the SCR are connected to the positive and negative outputs, respectively, of a full wave rectifier 40 which is, in turn, connected through two conductors 41 and 42 to the reference frequency source 15.

In the embodiment of the invention shown in FIG. 2, the reference frequency source 15 comprises a conventional static inverter consisting of a D.C. voltage source 43 connected across two transistors 44 and 45 in parallel so as to energize the primary winding 46 of a transformer 47 alternately in opposite directions at a fixed frequency within the range from, for example, 50 to 400 c.p.s. One secondary winding 48 of this transformer is connected through a pulse shaping circuit comprising a capacitor 49 and diode 50 and a resistor 51 to the conductors 25 and 26 so as to apply a firing pulse to the SCR 20 whenever the switch 24 is closed and the output of the secondary winding 48 is of the proper polarity. Another secondary winding 52 is connected across the conductors 41 and 42 so as to supply alternating voltage to the full wave rectifier 40. It is to be noted that the transformer 47 is of the saturable core type. With this arrangement, the inverter will automatically stop oscillating in the event of a sustained short circuit across its output without causing any harm to the system. Consequently, the inverter cannot oscillate as long as the SCR 28 is conductive. This ensures that the SCR 20 cannot be rendered conductive without a proper control signal being applied to both the SCR 28 and the SCR 20 as described hereinafter.

The motor speed control unit 14 comprises a unijunction transistor 55 having one base electrode connected through a primary winding 57 of a transformer 58 to ground and the other base electrode 59 through a resistor 60 to a positive conductor 61. The emitter electrode 62 of this transistor is joined through a capacitor 63 to ground and through a variable resistance 64 to the positive conductor 61. In addition, the conductor 37 is connected to ground through a resistor 65, and a Zener diode 66 and the positive conductor 61 leads to a junction between the resistor 65 and the diode 66. Finally, the conductors 35 and 36 are joined to a secondary winding 67 of the transformer 58.

In operation, whenever power is applied to the system the transistorized inverter 15 supplies a turn-on pulse through the conductors 25 and 26 to the gate control electrode 23 of the SCR 20. With this SCR conductive, there are three circuit paths set up simultaneously. First, power is supplied from the source 11 through the SCR 20 to the motor 10. Second, the line 37 is raised to a positive potential so that the capacitor 63 in the control unit 14 starts charging at a rate dependent upon the setting of the resistor 64. Third, the capacitor 30 in the commutator unit 13 is charged by the rectifier 40, the SCR 20, and the choke 32 until the positive potential at the anode 29 is approximately twice that of the battery 11, the charging rate being dependent upon the capacitance of the capacitor and the inductance of the choke. When the capacitor 30 has been charged in this manner and the capacitor 63 is charged sufficiently to raise the potential at the emitter of the unijunction transistor 55 to the proper level, the transistor 55 fires, generating a pulse in the secondary winding 67 of the transformer 58. This renders the SCR 28 conductive so that the reverse charge on the capacitor 30 is immediately applied across the SCR 20 turning that SCR off. It will be noted that the use of a common reference frequency source for the SCR 20 and the supply to the commutator unit 13 guarantees proper commutation regardless of which SCR is actuated first.

Thereafter, the capacitor 30 charges through the SCR 28 and the motor 10 from the power source 11 voltage. Following that, the rectifier 40 supplies holding current through the SCR 28 to maintain conduction therein until the SCR 20 is again rendered conductive by a pulse from the frequency source on the conductors 25 and 26. When that occurs, the charge on the capacitor 30 swings around in a resonant manner in conjunction with the choke 32 through the rectifier 40 so as to make the cathode 31 positive with respect to the anode 29 and thereby turn off the SCR 28. Thereafter, the capacitor 30 is charged by the rectifier 40 through the SCR 20 and, when another turn-off pulse is received from the control unit 14, the cycle is repeated again. By adjusting the resistor 64, the portion of the cycle in which the SCR 20 is conductive, and consequently the amount of power supplied to the motor 10, may be varied over a wide range without any appreciable dissipation of power during the nonconductive periods.

If desired, full speed operation of the motor 10 may be accomplished by opening the switch 34, thereby leaving the SCR 20 in a static conductive state. Controlled operation is regained within one cycle time by merely closing the switch 34. The motor may be brought to a full stop rapidly by opening the switch 24, thereby terminating the operation of the SCR 20 so that the SCR 28, being conductive, shorts out the inverter 15 stopping its oscillation. In this case also, controlled operation of the motor is regained within one cycle by closing the switch 24.

Figure 3:
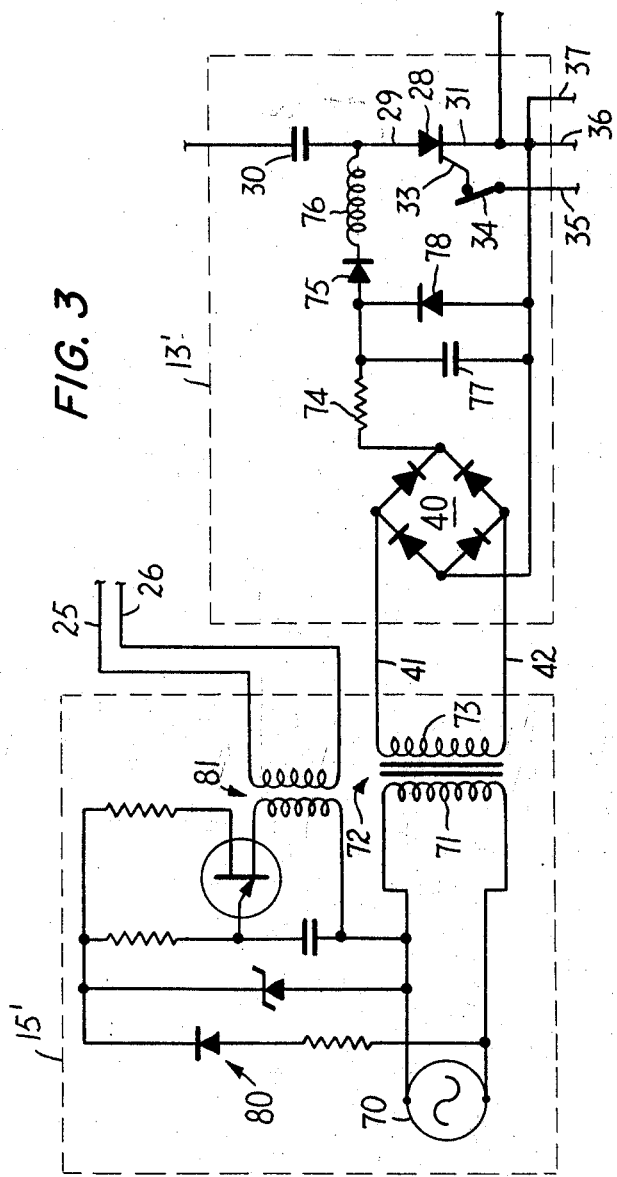
FIG. 3 is a schematic circuit diagram illustrating the circuit arrangement of certain other components of FIG. 1 for another embodiment of the invention.

In the alternate arrangement shown in FIG. 3, the reference frequency source 15' includes an A.C. voltage source 70 connected to the primary winding 71 of a current limiting transformer 72. The secondary winding 73 of this transformer is connected to the conductors 41 and 42 so as to supply alternating voltage to the full wave rectifier 40 in the commutator unit 13'. In this embodiment, the positive output of the rectifier unit 40 is connected through a resistor 74, a diode 75, and a choke 76 to the anode 29 of the SCR 28 and a capacitor 77 and diode 78 are connected between the resistor 74 and the cathode 31 of the SCR 28. The capacitor 77 regulates the voltage supply from the rectifier 40 and the diode 78 clamps the capacitor in the proper direction.

Also, a conventional unijunction transistor pulse rate generating circuit 80 is connected across the voltage source 70 in a conventional manner to provide gating pulses through a transformer 71 to the conductors 25 and 26 leading to the SCR 20 in the power control unit 12 and thus provide the operating frequency for the system. The remainder of this embodiment is the same as that shown in FIG. 2 and the operation of the embodiment is substantially identical to that described above with respect to FIG. 2.

Although the invention has been described herein with reference to specific embodiments, many modifications and variations therein will readily occur to those skilled in the art. Accordingly, all such variations and modifications are included within the intended scope of the invention as defined by the following claims.

I claim:
1. A D.C. motor speed control system comprising first electronic switch means adapted to be connected between a D.C. power source and a D.C. motor, reference frequency source means for activating said first electronic switch means at a selected frequency, second electronic switch means connected to open the first electronic switch means at an adjustable time interval after actuation, and means coupling the reference frequency source means to the second electronic switch means, wherein the reference frequency source means includes output transformer means arranged to permit a short circuit across the secondary winding.

2. A D.C. motor speed control system according to claim 1 wherein the reference frequency source means includes inverter means supplying alternating voltage from a D.C. source and the output transformer means comprises a saturable core transformer.

3. A D.C. motor speed control system according to claim 1 wherein the reference frequency source means comprises an A.C. voltage supply coupled to the second electronic switch means and includes pulse rate generator means for actuating the first electronic switch means.

4. A D.C. motor speed control system comprising first electronic switch means adapted to be connected between a D.C. power source and a D.C. motor, reference frequency source means for activating the first electronic switch means at a selected frequency, second electronic switch means connected to open the first electronic switch means at an adjustable time interval after actuation, means coupling the reference frequency source means to the second electronic switch means, and switch means for disconnecting the reference frequency source means from the first electronic switch means to terminate operation of a motor controlled by the system.

5. A D.C. motor speed control system comprising first electronic switch means adapted to be connected between a D.C. power source and a D.C. motor, reference frequency source means for activating the first electronic switch means at a selected frequency, second electronic switch means connected to open the first electronic switch means at an adjustable time interval after actuation, means coupling the reference frequency source means to the second electronic switch means, and switch means for disabling the second electronic switch means to permit maximum speed operation of a motor controlled by the system.

References Cited

UNITED STATES PATENTS

| | | | |
|---|---|---|---|
| 3,150,307 | 9/1964 | Kaeding | 318—345 |
| 3,222,582 | 12/1965 | Heyman et al. | 318—341 X |
| 3,274,474 | 9/1966 | Dow | 318—345 X |
| 3,363,160 | 1/1968 | Morris | 318—341 |

ORIS L. RADER, *Primary Examiner.*

K. L. CROSSON, *Assistant Examiner.*

U.S. Cl. X.R.

318—345, 503, 507